United States Patent
Ferlitsch

(10) Patent No.: US 8,355,147 B2
(45) Date of Patent: Jan. 15, 2013

(54) SYSTEMS AND METHODS FOR OBTAINING SCAN DATA BY LINKING IMAGES

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1294 days.

(21) Appl. No.: 10/994,966

(22) Filed: Nov. 22, 2004

(65) Prior Publication Data

US 2006/0109498 A1 May 25, 2006

(51) Int. Cl.
*G06F 3/12* (2006.01)
*H04N 1/04* (2006.01)

(52) U.S. Cl. ...... 358/1.15; 358/1.1; 358/1.13; 358/1.16; 358/1.18; 358/471; 358/474; 715/205

(58) Field of Classification Search ........... 358/1.15, 358/474, 1.1, 1.13, 471; 715/205
See application file for complete search history.

(56) References Cited

U.S. PATENT DOCUMENTS

| | | | |
|---|---|---|---|
| 3,958,088 A * | 5/1976 | Vieri ................ | 379/100.13 |
| 5,621,539 A * | 4/1997 | Brown et al. ........ | 358/400 |
| 6,377,357 B1 * | 4/2002 | Sato et al. .......... | 358/1.15 |
| 6,425,001 B2 | 7/2002 | Lo et al. | |
| 6,445,468 B1 | 9/2002 | Tsai | |
| 6,672,212 B1 * | 1/2004 | Ferlitsch ............ | 101/484 |
| 6,992,789 B2 * | 1/2006 | Czyszczewski et al. | 358/1.18 |
| 7,002,700 B1 * | 2/2006 | Motamed ............ | 358/1.1 |
| 7,265,853 B1 * | 9/2007 | Kara et al. ........... | 358/1.15 |
| 7,376,637 B2 * | 5/2008 | Morita ............... | 358/1.15 |
| 7,515,315 B2 * | 4/2009 | Ferlitsch ............. | 358/474 |
| 2002/0024685 A1 | 2/2002 | Sasaki et al. | |
| 2002/0051212 A1 * | 5/2002 | Kobayashi ......... | 358/261.2 |
| 2002/0168105 A1 | 11/2002 | Li | |
| 2002/0181804 A1 | 12/2002 | Simpson et al. | |
| 2003/0120729 A1 | 6/2003 | Kim et al. | |
| 2003/0184820 A1 | 10/2003 | Han et al. | |
| 2003/0200234 A1 * | 10/2003 | Koppich et al. ....... | 707/203 |

(Continued)

FOREIGN PATENT DOCUMENTS

EP 0 564 201 5/2000

(Continued)

*Primary Examiner* — Marivelisse Santiago Cordero
*Assistant Examiner* — Miya J Cato
(74) *Attorney, Agent, or Firm* — Austin Rapp & Hardman

(57) ABSTRACT

Systems and methods for obtaining and linking scanned images are disclosed. An exemplary system includes an imaging device. The imaging device includes a processor and memory in electronic communication with the processor. Instructions are stored in the memory. The instructions are executable to implement a method. A first scanned image of a multi-page document is obtained. The first scanned image is stored in the memory and is sent to a destination device. A second scanned image of the multi-page document is obtained. The second scanned image is stored in the memory of the imaging device such that the first scanned image is not needed. The second scanned image is sent to the destination device. The second scanned image is linked to the first scanned image in a logical multi-page scanned image wherein the first scanned image and the second scanned image are not in the same electronic file.

29 Claims, 4 Drawing Sheets

U.S. PATENT DOCUMENTS

| | | |
|---|---|---|
| 2003/0227639 A1* | 12/2003 | Ferlitsch ............... 358/1.13 |
| 2004/0021889 A1 | 2/2004 | McAfee et al. |
| 2004/0032624 A1 | 2/2004 | Stevens et al. |
| 2004/0042049 A1* | 3/2004 | Hulan et al. ............. 358/404 |
| 2004/0237037 A1* | 11/2004 | Sweet et al. ............. 715/513 |
| 2004/0243648 A1* | 12/2004 | Hidaka et al. ............ 707/200 |
| 2006/0044624 A1* | 3/2006 | Chapin et al. ............ 358/474 |

FOREIGN PATENT DOCUMENTS

| | | |
|---|---|---|
| EP | 1 187 448 | 3/2002 |
| JP | 2001-350745 | 12/2001 |
| JP | 2002-032285 | 1/2002 |

* cited by examiner

SYSTEMS AND METHODS FOR OBTAINING SCAN DATA BY LINKING IMAGES

TECHNICAL FIELD

The present invention relates generally to imaging devices. More specifically, the present invention relates to systems and methods for obtaining scan data by linking separate images into a logical multi-page scanned image.

BACKGROUND

Imaging devices are frequently used in many aspects of business, industry and academic endeavors. The term "imaging," as used herein, should be interpreted broadly to include any process for producing a copy of a document onto paper, a computer screen, an electronic image, or the like. Examples of imaging devices include printers, facsimile devices, copiers, scanners, display monitors, multi-function peripherals (MFPs), imagesetters, platesetters, filing devices, web publishing devices, and so forth. Documents which are sent to a printing device for printing are sometimes referred to as print jobs.

Many imaging devices can generate scanned image data. For example, some imaging devices include scanners which can scan a document to provide scanned image data. It is also possible that an imaging device may be able to read scanned image data from a storage device, extracted from a facsimile transmission, or compose scanned image data from a variety of imaging operations. There may also be other ways in which an imaging device may be provided with or otherwise obtain scanned image data.

When a user desires to generate a multi-page document as scanned image data (e.g., TIFF) and transmit it to and/or from the imaging device, the total size of the scanned image data may exceed the storage capacity of the imaging device. If the total size will exceed the storage capacity of the imaging device, the user would need to break the document up into several smaller documents and perform the operations separately. Each smaller document would need to be small enough so that the storage capacity was not exceeded.

In operation, typically imaging devices also are able to send scanned in documents to a computer or computing device. Typically the imaging device doesn't start transmission of the scanned in document until the entire document has been scanned in or otherwise obtained.

Therefore, there is a desire for a more effective method of generating and transmitting to and/or from multi-page scanned image data. Particularly, methods which support the generation/transmission when the device lacks available memory for the entire scanned image data, but sufficient memory for any one page.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
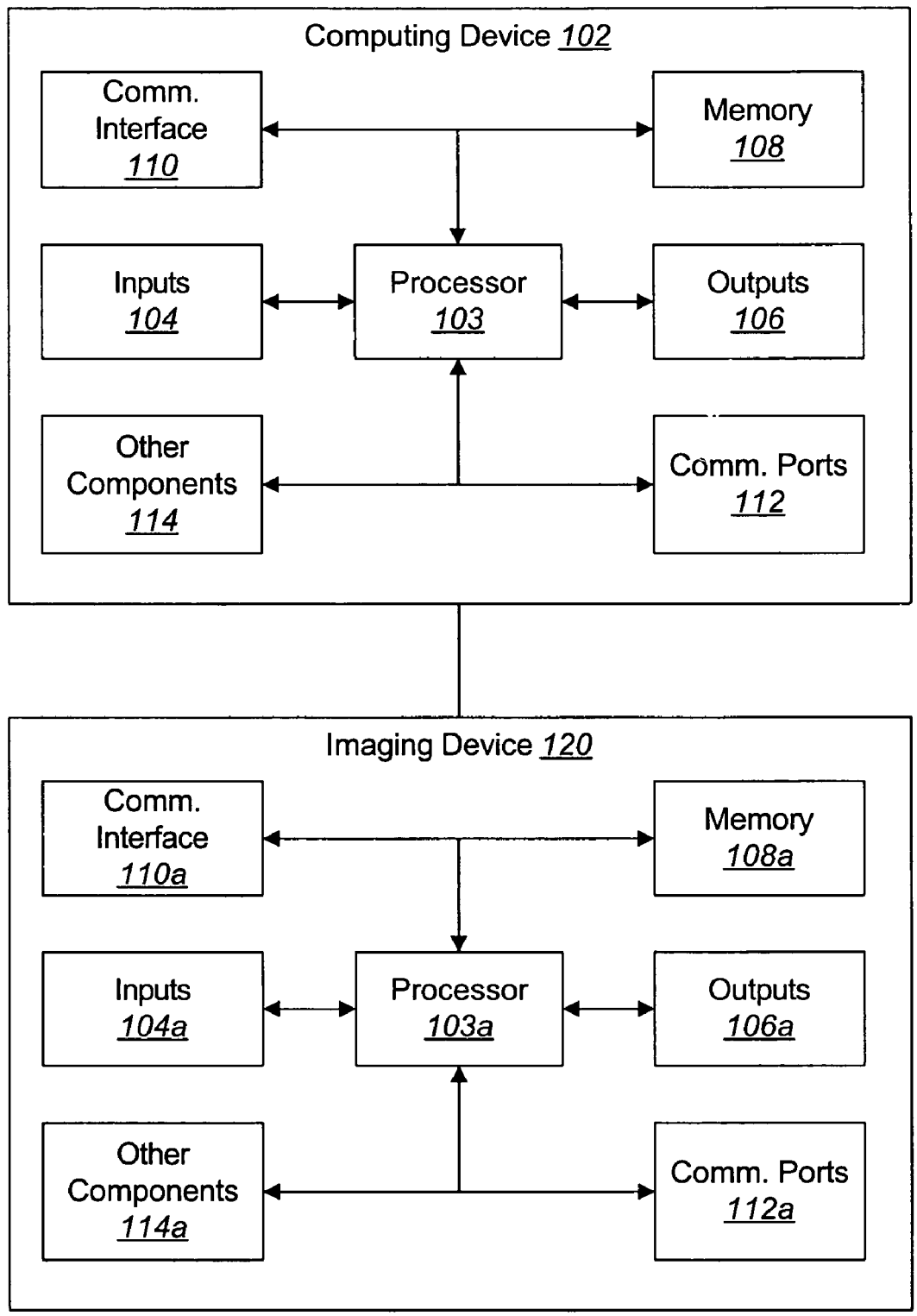
FIG. 1 is a block diagram illustrating the major hardware components typically utilized with embodiments herein.

Systems and methods for obtaining and linking scanned images are disclosed. A first scanned image of a multi-page document is obtained. The first scanned image is stored in the memory and is sent to a destination device. A second scanned image of the multi-page document is obtained. The second scanned image is stored in the memory of the imaging device such that the first scanned image is not needed. The second scanned image is sent to the destination device. The second scanned image is linked to the first scanned image in a logical multi-page scanned image wherein the first scanned image and the second scanned image are not in the same electronic file.

In one embodiment obtaining the first scanned image comprises scanning in the first scanned image using the imaging device. Similarly obtaining the second scanned image comprises scanning in the second scanned image using the imaging device.

Certain embodiments may be implemented such that the first scanned image is sent to the destination device before the second scanned image is obtained. In addition, the memory of the imaging device may be released after the first scanned image is sent. Regarding the sending, the first scanned image and the second scanned image may be sent separately and not transmitted in the same file or structure.

In another embodiment the first scanned image and the second scanned image may be merged into a single multi-page scanned image. Furthermore, the first scanned image and the second scanned image may be TIFF images, and they may be linked into a logical multi-image TIFF. The first scanned image and the second scanned image may be linked by a URL in an image file directory.

A computer-readable medium for storing program data is also disclosed. The program data comprises executable instructions for implementing a method in an imaging device for obtaining and linking scanned images. A first scanned image of a multi-page document is obtained. The first scanned image is stored in the memory and is sent to a destination device. A second scanned image of the multi-page document is obtained. The second scanned image is stored in the memory of the imaging device such that the first scanned image is not needed. The second scanned image is sent to the destination device. The second scanned image is linked to the first scanned image in a logical multi-page scanned image wherein the first scanned image and the second scanned image are not in the same electronic file.

An imaging device for obtaining and linking scanned images is disclosed. The imaging device includes a processor and memory in electronic communication with the processor. Instructions are stored in the memory. The instructions are executable to implement a method. A first scanned image of a multi-page document is obtained. The first scanned image is stored in the memory and is sent to a destination device. A second scanned image of the multi-page document is obtained. The second scanned image is stored in the memory of the imaging device such that the first scanned image is not needed. The second scanned image is sent to the destination device. The second scanned image is linked to the first scanned image in a logical multi-page scanned image wherein the first scanned image and the second scanned image are not in the same electronic file.

The imaging device may be one of various kinds of imaging devices. For example, the imaging device may be, but is not limited to, a printer, a facsimile device, a copier, a scanner, a display monitor, an imagesetter, a platesetter, an image store, an electronic whiteboard, a cell phone digital camera, or a multi-function peripheral device.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106.

The processor 103 controls the operation of the computing device 102 and may be embodied as a microprocessor, a microcontroller, a digital signal processor (DSP) or other device known in the art. The processor 103 typically performs logical and arithmetic operations based on program instructions stored within the memory 108.

The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures. Examples of different kinds of input devices 104 include a keyboard, mouse, microphone, remote control device, button, joystick, trackball, touchpad, lightpen, etc. Examples of different kinds of output devices 106 include a speaker, printer, etc. One specific type of output device which is typically included in a computer system is a display device (not shown). Display devices used with embodiments disclosed herein may utilize any suitable image projection technology, such as a cathode ray tube (CRT), liquid crystal display (LCD), light-emitting diode (LED), gas plasma, electroluminescence, or the like. A display controller may also be provided, for converting data stored in the memory 108 into text, graphics, and/or moving images (as appropriate) shown on the display device.

The computing device 102 may also include memory 108. The memory 108 may be a separate component from the processor 103, or it may be on-board memory 108 included in the same part as the processor 103. For example, microcontrollers often include a certain amount of on-board memory. As used herein, the term "memory" 108 is broadly defined as any electronic component capable of storing electronic information, and may be embodied as read only memory (ROM), random access memory (RAM), magnetic disk storage media, optical storage media, flash memory devices in RAM, on-board memory included with the processor 103, EPROM memory, EEPROM memory, registers, etc. The memory 108 typically stores program instructions and other types of data. The program instructions may be executed by the processor 103 to implement some or all of the methods disclosed herein.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102. The communication interfaces 110 may be based on wired communication technology, wireless communication technology, or both. Examples of different types of communication interfaces 110 include a serial port, a parallel port, a Universal Serial Bus (USB), an Ethernet adapter, an IEEE 1394 bus interface, a small computer system interface (SCSI) bus interface, an infrared (IrDA) communication port, a Bluetooth wireless communication adapter, a Wi-Fi wireless communication adaptor, and so forth.

The computing device 102 may also include other communication ports 112. In addition, other components 114 may also be included in the electronic computing device 102.

Many kinds of different devices may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, an Apple computer, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. The imaging device may be a single or a plural grouping (e.g., pool or cluster) of two or more devices.

The imaging device 120 is a type of computing device. Thus, the illustrated components of the computing device 102 may also be typical of the components often found in an imaging device 120. The imaging device 120 typically includes its own processor 103a, memory 108a, inputs 104a, outputs 106a, etc., as illustrated.

In light of the definition of an imaging device 120 above, the term imaging job, as used herein, is broadly defined as any instruction or set of instructions that are sent to an imaging device to cause an image to be printed, imaged, scanned, sent, converted, filed, published, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Scan jobs and scanning devices are used to illustrate exemplary embodiments, but other kinds of imaging jobs and imaging devices may be used in implementations of the embodiments disclosed herein.

Figure 2:
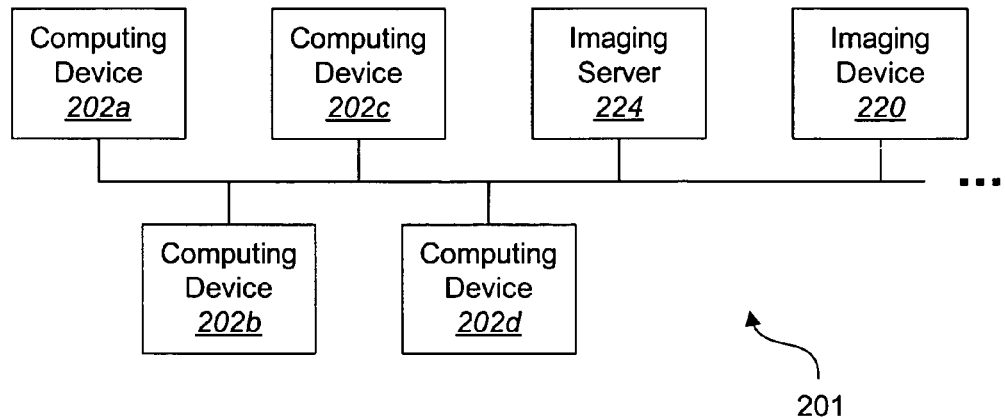
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network comprising a plurality of computing devices 202, an imaging device 220 and an imaging server 224.

This invention is independent of the job control command and image data language and syntax. For example, the job control language may be PJL and the imaging job data language may be PCL or Postscript.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a scan job may be initiated by an application using a scanner driver which spools a scan job to the print/scan spooler. By way of further example, the scan job may be initiated at the operations panel (e.g., front panel or remote web interface) of the imaging device.

The systems and methods herein are independent of the method to initiate the imaging job and the method to despool the image job and/or imaging result to/from the imaging client and imaging device.

The systems and methods of embodiments herein typically comprise one or more scanning or multi-functional peripheral (MFP) devices, which may be connected locally, through a network or through a remote scanning environment. These systems and methods may further comprise a computing device capable of generating or transmitting a scan job to a scanning device as in "pull scanning" or transmitting the location to receive the result of the scan job (i.e., scanned image data) from the scanning device as in "push scanning". These embodiments may also comprise a scanner driver, a spooler, a scan processor and other scan system components that process, transmit or otherwise function to produce a scan job. In some embodiments, these components may exist in a Microsoft Windows 98, Me, NT, 2000, XP, 2003 Server or similar operating system. Details of these operating system print system components and processes may be obtained by reference to the Microsoft Windows Driver Development Kits (DDKs) and associated documentation, which are hereby incorporated herein by reference.

The definitions in this and subsequent paragraphs apply throughout this specification and related claims. The term "scan job" may refer to any combination of data that can be scanned image data. Scanned image data may comprise a single or multiple bitmap images, or be additionally decomposed into non-bitmap components such as text and line/art.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

When a user desires to generate a multi-page document as scanned image data (e.g., TIFF) and transmit it to/from an imaging device 120 (e.g., network scan), the total size of the scanned image data may exceed the storage capacity of the imaging device 120. In such a case, the imaging device 120 may be unable to process the scanned image data.

For example, an imaging device may support scanning in a document as a walkup operation and then designating a destination (e.g., email address, FTP site) to transmit the document to. The Sharp AR-N275 is an example of a Multi-Function Peripheral ("MFP") that supports this capability. In one case, the user may scan and send a single page document, such as by placing the single page on the platen and operating the network scan feature from the device's front panel (not shown). In this case, the device scans the page and creates the corresponding scanned image data, which is then held temporarily in memory (e.g., flash). The scanned image data may also be additionally compressed to conserve storage and reduce the amount of data to transmit over the network. The image is then transmitted to the destination and the memory/storage on the device consumed for the image is then released (i.e., usable for subsequent use).

In another case, the user may scan and send a multi-page document using the Automatic Document Feeder ("ADF") and operating the network scan feature from the device's front panel. In this case, the device successively scans each page in the document as it is fed from the ADF. For each scanned page, the device creates the corresponding scanned image data, which is temporarily held in memory. Again, the image data may additionally be compressed. During, or upon completion, of the scan, the individual scanned image pages are merged into a single multi-page scanned image data (e.g., multi-image TIFF). Upon completion, the entire multi-page scanned image data is sent to the destination and the memory/storage on the device consumed for the image is then released.

This method stiff suffers in that (1) the scanned image data cannot start transmission until the entire document is scanned, (2) the device needs sufficient available memory to hold the entire scanned document at once, and (3) the transmission method needs to have the available bandwidth to transmit the entire scanned document as a single transmission session (e.g., for example, using email, there may be an imposed limitation on the size of attachments). Therefore, there is a desire for a more effective method of generating and transmitting to/from multi-page scanned image data. Particularly, methods which support the generation/transmission when the device lacks available memory for the entire scanned image data, but sufficient memory for any one page.

Disclosed herein is an effective method for generating and transmitting multi-page scanned image data (e.g., multi-image TIFF) to/from a digital imaging device, such as an MFP. In particular, a method is disclosed which supports the generation/transmission when the device lacks available memory for the entire scanned image data, but sufficient memory for any one page.

In the embodiments herein the user performs an operation on an MFP to generate a multi-page scanned image data from some soft or hardcopy source (e.g., document scanned in from ADF) and transmits the multi-page scanned image data to a destination (e.g., network scan). The embodiments herein differ from the conventional means, as described above, as follows:

1. The scanned images representing the pages are not scanned into a single physical scanned file (i.e., hardwired). Instead, each page is scanned into a separate scanned image. All of the separate scanned images are then electronically linked together (e.g., using URLs in the IFDs to link TIFF images into a logical multi-image TIFF).
2. The scanned page images may be transmitted individually and without waiting for the entire document to be scanned.
3. The memory consumed on the device for each scanned page image may be released and reused as the scanned page images are transmitted.
4. The destination may control the generation and/or transmission of the scanned page images on an as need basis, by requesting the image via the electronic link.
5. The destination may either support operating on the multi-page scanned image as collection of images with links, or fuse them back together into a physical multi-page scanned image.

Figure 3:
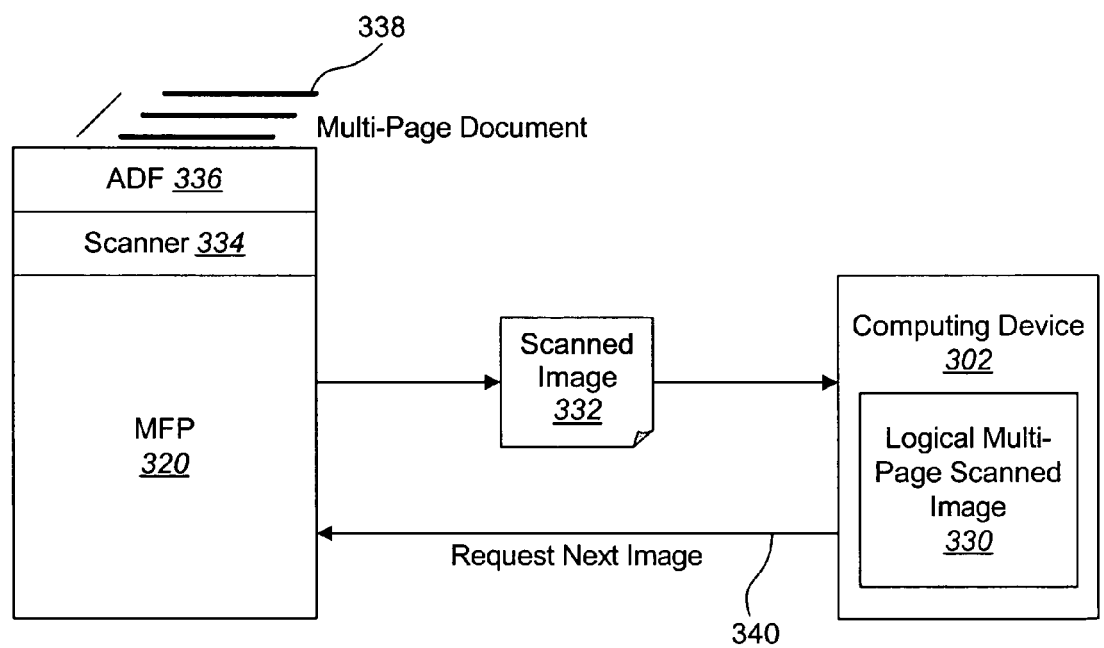
FIG. 3 is a block diagram illustrating the sequential transfer of scanned images from the imaging device to the computing device.

FIG. 3 is a block diagram illustrating the sequential transfer of scanned images from the imaging device 320 to the computing device 302. A logical multi-page scanned image 330 is created on the computing device 302. A logical multi-page scanned image 330 is a set of separate scanned images 332 that when taken together make up a multi-page scanned image 330 and that are not originally transmitted in the same file or structure. An imaging device 320 (e.g., host or MFP) helps create a logical multi-page scanned image 330 from a soft or hardcopy source by obtaining scanned images 332 that are not multi-page scanned images and by sending them to a computing device 330 where the logical multi-page scanned image 330 is stored. For example, the scanned image data 332 may be generated by, but are not limited to, the following imaging operations:

1. A document scanner 334 where the input is a hardcopy multi-page document 338 fed from an automatic document feeder 336 (ADF).
2. A document or platen scanner 334 where the input is a sequence of single and/or multi-page documents fed from the ADF 336 or onto the platen into a scan job build.
3. Images selected off a digital memory stick, or image server, accessible by the device 320 into a scan into a composite image.
4. Inputs from a fax.
5. Inputs from an electronic whiteboard.
6. Inputs from a cell phone digital camera.

The device 320 converts each page (or image) input into a single scanned image 332 format, such as TIFF. For each image, the device 320 allocates available memory (e.g., flash, ROM, hard-disk) to hold the scanned image data 332, which may be further compressed (e.g., G3, G4, Delta, JPEG, Run-Length, etc.).

Other operations may occur on the scanned image data 332 including, but not limited to:

1. Cropping, Rotation, Scaling.
2. Resolution Changes.
3. Color/Gray Scale Conversion.
4. Content Filtering
5. Encryption (such as using public/private key encryption (PKE)).
6. Bar Code Stamping.
7. Image Filtering and Enhancements.
8. Optical Character Recognition (OCR).

The scanned image data 332 format also supports a method to electronically link the scanned image data 332 to another scanned image 332 as a sequence of scanned images 332. For example, the scanned image data 332 format may be TIFF and the link may be placed in the image file directory (IFD) using a Universal Resource Locator (URL). Once a scanned image 332 for an individual page (or image) is produced, the device 320 or the computing device 302 inserts the electronic link to the location of the next image or null if there are no remaining pages (or images).

The imaging device 320 may produce these scanned images 332 at a variety of rates, including, but not limited to:

1. One at a time—pushed. The destination 302 confirms reception of the image 332 before the device 320 produces the next image 332.
2. One at a time—pulled. The destination 302 requests 340 the next image 332 before the imaging device 320 produces it.
3. Batch. The imaging device 320 continues to produce scanned image pages 332 as memory is available or until some other pre-determined threshold is reached.

Once the imaging device 320 has transmitted a scanned image page 332 to the destination 302 and verified the completion of the transmission, the imaging device 320 releases the memory consumed on the device 320 for the image, which makes it available for reuse. The device 320 may use any form of transmission, such as, but not limited to: FTP, email, HTTP, SOAP/XML or a proprietary protocol.

Figure 4:
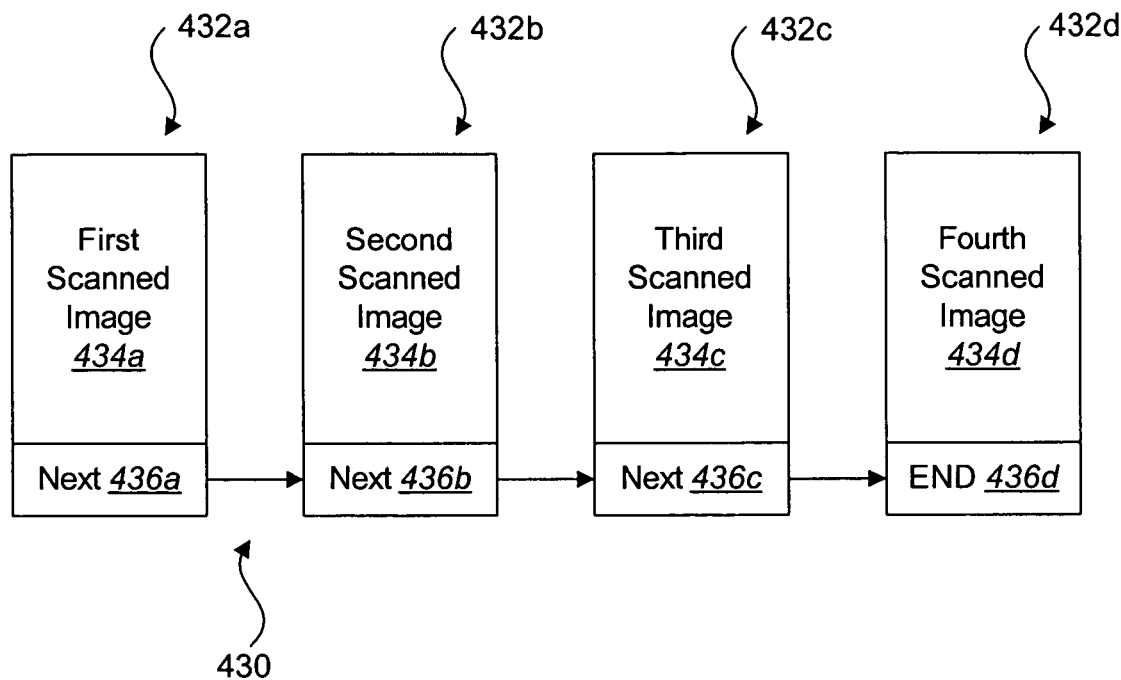
FIG. 4 is a block diagram illustrating a logical multi-page scanned image.

FIG. 4 is a block diagram illustrating a logical multi-page scanned image 430. In this embodiment, the logical multi-page scanned image 430 comprises a plurality of single scanned images 432a-432d. Each scanned image 332 is stored on the computing device 330 as a separate file. Each scanned image 332 includes the image 434 and an indicator 436 of the next scanned image in the sequence. If there is no next image, then the indicator 436 may be set to an end indicator 436d.

Figure 5:
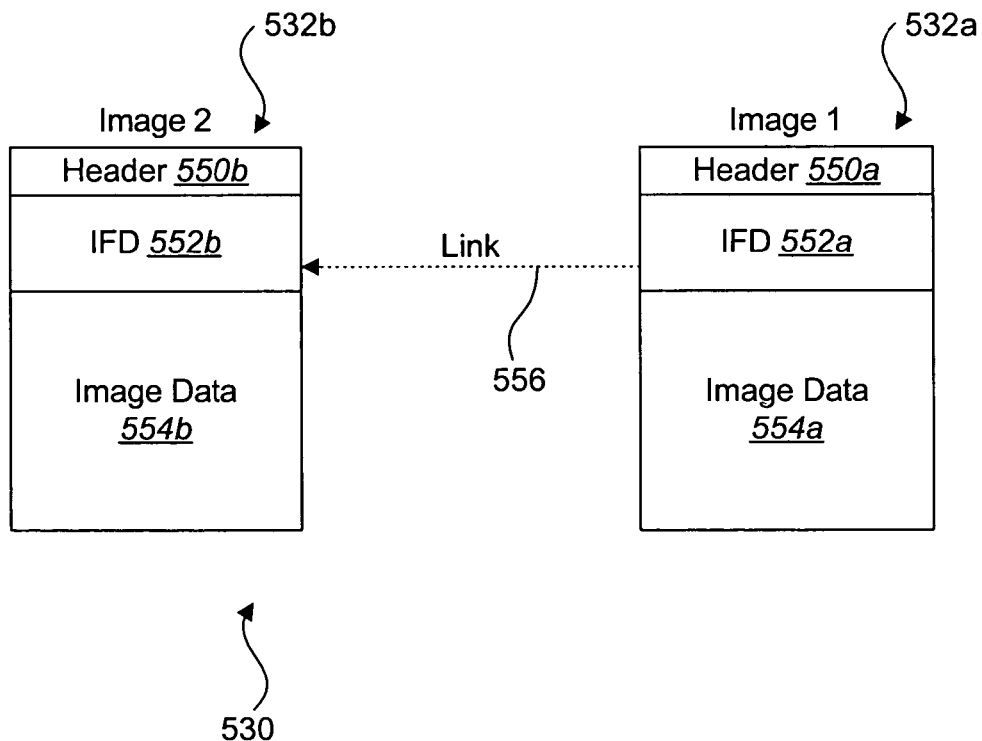
FIG. 5 illustrates the format of a logical multi-page scanned image.

Referring now to FIG. 5, the format of a logical multi-page scanned image 530 (e.g., TIFF) is illustrated. The logical multi-page scanned image 530 includes multiple scanned images 532. In the preferred embodiment, the format of the scanned image data 532 would be the tagged image file format (TIFF), version 6.0. According to the multi-image extension to the minimum baseline standard, the file is constructed with a header 550, followed by one or more pairs of image file directories 552 (IFD) and image data 554, one pair per image. Each pair of IFD/image data would be linked 556 into a sequential ordering through a file offset pointer (i.e., Offset of Next IFD); whereby, the last IFD/image data in the sequence would be terminated by setting this offset pointer to NULL.

Using this format for this embodiment, each image 554 would represent a page, herein referred to as the page image. Generally, each physical TIFF file would hold only one page image, but is not otherwise restricted. For example, an implementation for a duplex scan may choose to have each physical TIFF file represent the front and back pages of each sheet. In other implementations, the number of pages in a physical TIFF file may be based on a total file size threshold. That is, pages are added to the same physical TIFF file until it would exceed some maximum size threshold.

Each physical TIFF file is then linked to the next physical TIFF file using an electronic link 556. An electronic link is anything that can be: (1) electronically represented in the image data (i.e., digital data), and (2) resolved to locate another document stored electronically.

Examples of this include, but are not limited to:

1. Universal Resource Locator (URL).
2. Network File Pathname on a network file system.
3. Proprietary identification/locator system.

The electronic link would then be placed in the last IFD in the physical TIFF file, as follows:

1. The Offset to the next IFD would be set to NULL. This would indicate to a TIFF interpreter the end of the physical TIFF file.
2. A directory entry would be used to indicate the electronic link. The entry would use a proprietary (i.e., unused by the standard) tag to indicate that this is the electronic link.

Figure 6:
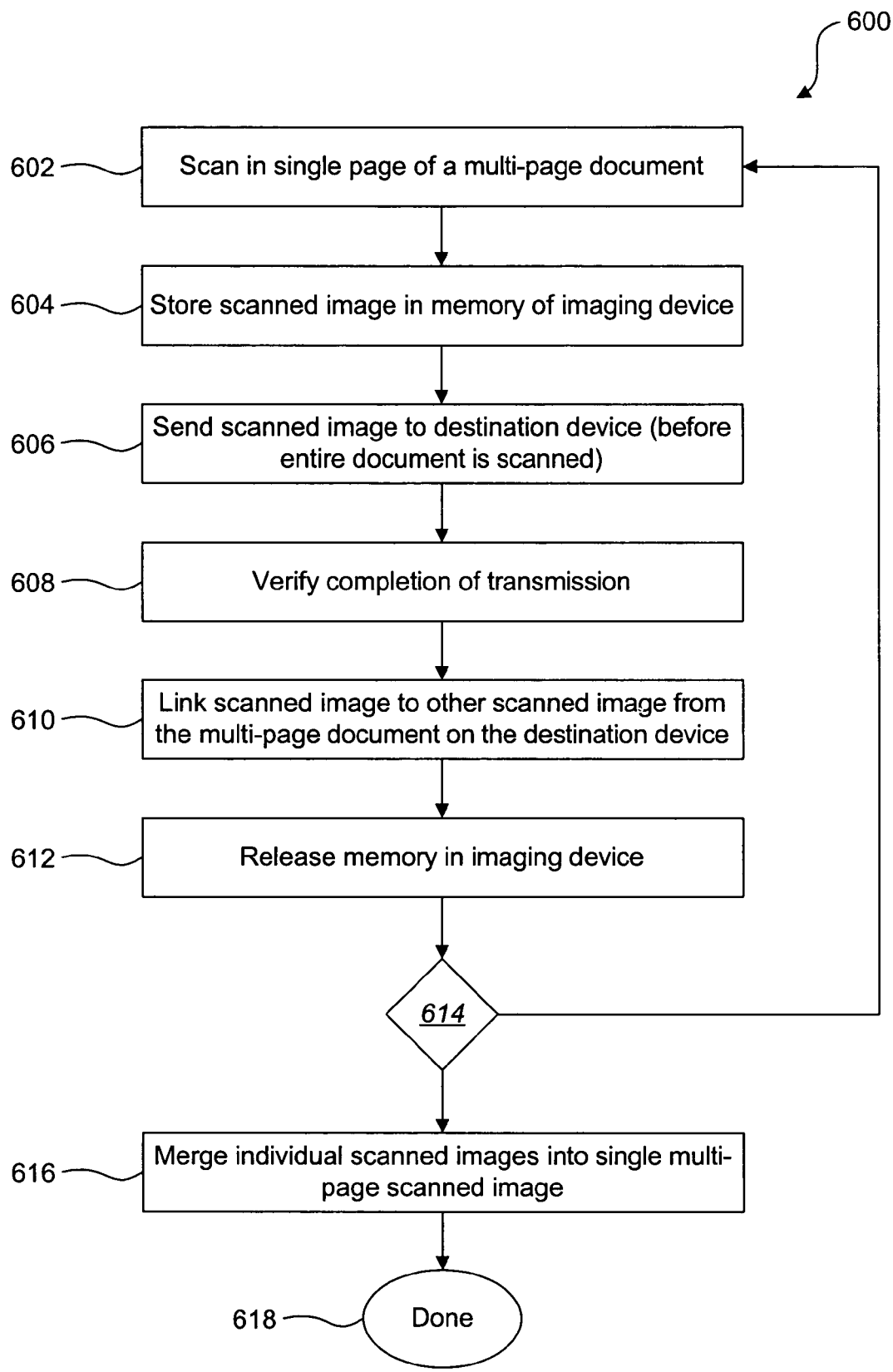
FIG. 6 is a flow diagram illustrating an embodiment of a method for generating a logical multi-page scanned image through transmissions of separate scanned images.

FIG. 6 is a flow diagram illustrating an embodiment of a method 600 for generating a logical multi-page scanned image through transmissions of separate scanned images. A single page from a multi-page document is scanned 602 in. As discussed above, the single scanned image may also be obtained from other means besides a scanner. However, the embodiment of FIG. 6 assumes a scanner is used to obtain the separate scanned images. The scanned image is then stored 604 in the memory of the imaging device 120. The scanned image is then sent 606 to a destination device 102 before the entire multi-page document is scanned. The completion of the transmission is verified 608.

If there were any previous scanned images that were sent for this multi-page document, the scanned image is linked 610 to the other related scanned images from the multi-page document on the destination device 102. The memory may then be released 612 on the imaging device 120. It is then determined whether there are any more pages to be added to the logical multi-page scanned image. If there are more images, then the method returns to the scanning step 602. If there are not any more images, then the entire logical multi-page scanned image is residing on the computing device 102. All of the separate images making up the logical multi-page scanned image may then be merged 616 into a single multi-page scanned image.

Other embodiments include, but are not limited to, host destinations on the Microsoft Windows Operating System, Apple MacIntosh Operating System, Linux Operating System, UNIX operating systems such as System V Unix Operating Systems, BSD Unix Operating Systems, OSF Unix Operating Systems, Sun Solaris Operating Systems, HP/UX Operating Systems, IBM AIX, and other operating systems such as IBM Mainframe MVS Operating System (OS/390) and IBM AS/400.

Other embodiments include device source or destinations, such as a scanner, copier, printer, facsimile device, multi-function peripheral, document/image server, tablet PC, electronic whiteboard, digital camera, filing device, and CD burner.

Other embodiments include imaging operations, such as: scan to host, scan to image server, fax transmission/reception, send image data by email, and digital direct print (i.e., printing from an image source directly to a printer w/o converting the digital data into printer ready data).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for obtaining and linking scanned images, comprising:
    obtaining a first scanned image of a multi-page document, wherein the first scanned image comprises a single page of a multi-page document;
    storing the first scanned image in memory of an imaging device;
    sending the first scanned image to a destination device;
    obtaining a second scanned image of the multi-page document, wherein the second scanned image comprises a single page of a multi-page document, wherein the second scanned image is not obtained until after a message is received from the destination device requesting that the second scanned image be obtained;
    storing the second scanned image in the memory of the imaging device, wherein the memory used to store each scanned image is released when that scanned image has been sent to the destination device;
    sending the second scanned image to the destination device in a separate transmission than the first scanned image; and
    linking the second scanned image to the first scanned image in a logical multi-page scanned image that comprises multiple scanned images linked together, wherein the first scanned image and the second scanned image are not in the same electronic file, wherein the linking comprises placing an electronic link in a first electronic file comprising the first scanned image that indicates the location of a second electronic file comprising the second scanned image.

2. The method of claim 1, wherein obtaining the first scanned image comprises scanning in the first scanned image using the imaging device.

3. The method of claim 2, wherein the first scanned image is sent to the destination device before the second scanned image is obtained.

4. The method of claim 3, further comprising releasing the memory of the imaging device after the transmission of the first scanned image has been verified.

5. The method of claim 1, further comprising merging the first scanned image and the second scanned image into a single multi-page scanned image.

6. The method of claim 4, wherein the first scanned image and the second scanned image are TIFF images, and wherein the first scanned image and the second scanned images are linked into a logical multi-image TIFF.

7. The method of claim 6, wherein the first scanned image and the second scanned image are linked by a URL in an image file directory.

8. The method of claim 7, wherein the imaging device lacks available memory for storing the entire multi-page document but does have sufficient memory for storing any one page of the multi-page document.

9. The method of claim 8, wherein the memory used to store each scanned image is released and reused after the scanned image is sent.

10. The method of claim 9, wherein the last scanned image in the image file directory comprises a NULL value in its URL.

11. The method of claim 10, wherein the destination device uses an electronic link to request that the second scanned image be obtained.

12. The method of claim 11, wherein the destination devices is a server.

13. The method of claim 1, wherein the first scanned image and the second scanned image are not transmitted in the same structure.

14. A non-transitory computer-readable medium for storing program data, wherein the program data comprises executable instructions for:
    obtaining a first scanned image of a multi-page document, wherein the first scanned image comprises a single page of a multi-page document;
    storing the first scanned image in memory of an imaging device;
    sending the first scanned image to a destination device;
    obtaining a second scanned image of the multi-page document, wherein the second scanned image comprises a single page of a multi-page document, wherein the second scanned image is not obtained until after a message is received from the destination device requesting that the second scanned image be obtained;

storing the second scanned image in the memory of the imaging device, wherein the memory used to store each scanned image is released when that scanned image has been sent to the destination device; and sending the second scanned image to the destination device in a separate transmission than the first scanned image, wherein the destination device links the second scanned image to the first scanned image in a logical multi-page scanned image that comprises multiple scanned images linked together, wherein the first scanned image and the second scanned image are not in the same electronic file, wherein the linking comprises placing an electronic link in a first electronic file comprising the first scanned image that indicates the location of a second electronic file comprising the second scanned image.

15. The computer-readable medium of claim 14, wherein obtaining the first scanned image comprises scanning in the first scanned image using the imaging device.

16. The computer-readable medium of claim 14, wherein the first scanned image is sent to the destination device before the second scanned image is obtained.

17. The computer-readable medium of claim 14, further comprising executable instructions for releasing the memory of the imaging device after the transmission of the first scanned image has been verified.

18. The computer-readable medium of claim 14, wherein the destination device merges the first scanned image and the second scanned image into a single multi-page scanned image.

19. The computer-readable medium of claim 14, wherein the first scanned image and the second scanned image are TIFF images, and wherein the first scanned image and the second scanned images are linked into a logical multi-image TIFF.

20. The computer-readable medium of claim 19, wherein the first scanned image and the second scanned image are linked by a URL in an image file directory.

21. The computer-readable medium of claim 14, wherein the first scanned image and the second scanned image are not transmitted in the same structure.

22. An imaging device comprising:
a processor;
memory in electronic communication with the processor;
instructions stored in the memory, the instructions being executable to:
obtain a first scanned image of a multi-page document, wherein the first scanned image comprises a single page of a multi-page document;
store the first scanned image in the memory;
send the first scanned image to a destination device;
obtain a second scanned image of the multi-page document, wherein the second scanned image comprises a single page of a multi-page document, wherein the second scanned image is not obtained until after a message is received from the destination device requesting that the second scanned image be obtained;
store the second scanned image in the memory, wherein the memory used to store each scanned image is released when that scanned image has been sent to the destination device; and
send the second scanned image to the destination device in a separate transmission than the first scanned image, wherein the destination device links the second scanned image to the first scanned image in a logical multi-page scanned image that comprises multiple scanned images linked together, wherein the first scanned image and the second scanned image are not in the same electronic file, wherein the linking comprises placing an electronic link in a first electronic file comprising the first scanned image that indicates the location of a second electronic file comprising the second scanned image.

23. The imaging device of claim 22, wherein the imaging device is selected from the group consisting of a printer, a facsimile device, a copier, a scanner, a display monitor, an imagesetter, a platesetter, an image store, an electronic whiteboard, a cell phone digital camera, and a multi-function peripheral device.

24. The imaging device of claim 22, wherein obtaining the first scanned image comprises scanning in the first scanned image using the imaging device.

25. The imaging device of claim 24, wherein the first scanned image is sent to the destination device before the second scanned image is obtained.

26. The imaging device of claim 25, further comprising releasing the memory of the imaging device after the transmission of the first scanned image has been verified.

27. The imaging device of claim 26, wherein the first scanned image and the second scanned image are TIFF images, and wherein the first scanned image and the second scanned images are linked into a logical multi-image TIFF.

28. The imaging device of claim 27, wherein the first scanned image and the second scanned image are linked by a URL in an image file directory.

29. The imaging device of claim 26, wherein the first scanned image and the second scanned image are not transmitted in the same structure.

* * * * *